(12) United States Patent
Hoofman et al.

(10) Patent No.: US 8,906,534 B2
(45) Date of Patent: Dec. 9, 2014

(54) STACKED MULTI-CELL BATTERY CONCEPT

(75) Inventors: Romano Hoofman, Geel (BE); Aurelie Humbert, Schaerbeek (BE); Matthias Merz, Leuven (BE); Youri Victorovitch Ponomarev, Leuven (BE); Remco Henricus Wilhelmus Pijnenburg, Hoogeloon (NL); Gilberto Curatola, Leuven (BE)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 974 days.

(21) Appl. No.: 12/474,165

(22) Filed: May 28, 2009

(65) Prior Publication Data

US 2009/0297938 A1    Dec. 3, 2009

(30) Foreign Application Priority Data

May 28, 2008    (EP) ................................. 08104140

(51) Int. Cl.
```
H01M 6/18      (2006.01)
H01M 10/05     (2010.01)
H01M 6/40      (2006.01)
H01M 4/70      (2006.01)
H01M 10/04     (2006.01)
H01M 10/0585   (2010.01)
H01M 10/0562   (2010.01)
```

(52) U.S. Cl.
CPC *H01M 6/40* (2013.01); *H01M 4/70* (2013.01); *H01M 10/0436* (2013.01); *H01M 10/0585* (2013.01); *H01M 6/18* (2013.01); *H01M 6/188* (2013.01); *H01M 10/0562* (2013.01)

USPC ......... 429/124; 29/623.1; 429/156; 429/162; 429/523

(58) Field of Classification Search
CPC ......... H01M 4/70; H01M 6/18; H01M 6/188; H01M 6/40; H01M 10/0436; H01M 10/0562; H01M 10/0585
USPC ............. 429/96, 99, 127, 156, 162, 206, 245, 429/507, 523, 535, 469, 508, 124, 149; 29/623.1, 623.2; 502/101; 455/572–574
See application file for complete search history.

(56) References Cited

U.S. PATENT DOCUMENTS

| | | |
|---|---|---|
| 5,187,033 A | 2/1993 | Koshiba |
| 6,175,214 B1 | 1/2001 | Mendoza et al. |

(Continued)

OTHER PUBLICATIONS

J. Kawamura et al., "Thin Film Batteries, Solid State Ionics for Batteries (preprint), ed. T. Minami, Springer-Verlag, Tokyo (2005), p. 64-72".

(Continued)

*Primary Examiner* — Joseph Drodge
(74) *Attorney, Agent, or Firm* — Haynes and Boone, LLP

(57) ABSTRACT

A device is provided that includes a battery layer on a substrate, where a first battery cell is formed in the battery layer. The first battery cell includes a first anode, a first cathode, and a first electrolyte arranged between the first anode and the first cathode, where the first anode, the first cathode, and the first electrolyte are arranged in the battery layer such that perpendicular projections onto the substrate of each of the first anode and the first cathode are non-overlapping. A method of manufacturing such device is also provided. A system is also provide that includes such device for supplying power to an electronic device.

20 Claims, 12 Drawing Sheets

(56) References Cited

U.S. PATENT DOCUMENTS

| | | | |
|---|---|---|---|
| 6,495,283 B1* | 12/2002 | Yoon et al. | 429/162 |
| 6,972,161 B2* | 12/2005 | Beatty et al. | 429/456 |
| 7,067,215 B2* | 6/2006 | Lazaroff et al. | 429/508 |
| 7,603,144 B2* | 10/2009 | Jenson et al. | 455/573 |
| 2003/0165744 A1* | 9/2003 | Schubert et al. | 429/303 |
| 2004/0048157 A1* | 3/2004 | Neudecker et al. | 429/231.2 |
| 2006/0032046 A1* | 2/2006 | Nathan et al. | 29/623.5 |
| 2007/0015061 A1 | 1/2007 | Klaassen | |
| 2007/0134549 A1* | 6/2007 | Nathan et al. | 429/149 |
| 2007/0141445 A1* | 6/2007 | Hertz et al. | 429/40 |

OTHER PUBLICATIONS

"Thin-Film Battery May Energize RFID", Oct. 18, 2002 (http://www.rfidjournal.com/article/view/94); RFID Journal, 2 pages.

Li Yang et al., "RFID Tag and RF Structures on a Paper Substrate Using Inkjet-Printing Technology," IEEE Transactions on Microwave Theory and Techniques, vol. 55, No. 12, Dec. 2007, pp. 2894-2901.

* cited by examiner

STACKED MULTI-CELL BATTERY CONCEPT

CROSS REFERENCE

This application claims priority to European patent application number 08104140.2, filed May 28, 2008, the disclosure of which is incorporated herein by reference.

FIELD OF THE INVENTION

The invention relates to a device comprising a battery layer on a substrate, wherein a first battery cell is formed in the battery layer. The invention further relates to a method of manufacturing such device. The invention also relates to system comprising an electronic device and the device comprising the battery layer with the first battery cell, wherein the first battery cell is arranged for supplying power to the electronic device.

BACKGROUND OF THE INVENTION

Autonomous MEMS devices require similarly miniaturized power sources. However, most battery concepts are quite bulky. Recently, flexible thin-film batteries are being developed ideally suited for a variety of applications where small power sources are needed. Such flexible thin-film batteries are known from publications such as: ["*Flexible Thin-film Batteries: A Global Technology*", Industry and Market Analysis Innovative Research and Products (iRAP), Inc. Jun. 1, 2007].

There are many different application areas of thin-film batteries. One application area is the use of thin-film batteries in RFID tags, see also publication: http://www.rfidjournal.com/article/view/94]. An RFID tag may be provided with an external energy source like a thin-film battery, which is then also being referred to as active RFID tags. Active RFID tags have a longer read range and offer better performance than passive RFID tags that draw their energy from a reader. The battery may be recharged by inductive coupling, or any other type of energy scavenger. In addition, a battery on board of the RFID tags can also enable additional embedded functionalities, such as sensor functionality.

Thin-film batteries could also be used to power smart cards or increase the range of identity badges with onboard biometrics. Another intriguing potential is the use of thin-film batteries in low-cost sensors.

Typically, thin-film batteries are suitable for applications requiring low-voltage power (1.5V-3.0V). Through stacking of multiple cells, higher voltages can be obtained by arranging the cells in series. By arranging cells in parallel, a larger capacity can be obtained. A battery's capacity depends primarily on the volume of both anode and cathode. Stacked thin film batteries are typically made by thin-film deposition, i.e. horizontal stacking of the different layers. In this configuration the capacity of the battery cells is mainly limited by the total area of the thin films.

U.S. Pat. No. 6,495,283 discloses a known thin-film battery. It discloses a battery having a trench structure which can increase an effective area per unit area. The battery forms trenches on thin film elements including a substrate, thereby increasing a contact interface between a cathode and an electrolyte and between the electrolyte and an anode, and simultaneously increasing an amount of an electrode per unit area. As a result, a high performance battery is provided, wherein the current density and the total current storage density are increased. Also, the charging speed after discharge is improved.

A problem with the known thin-film battery is that battery cell dimensions are not substantially determined by the design.

SUMMARY OF THE INVENTION

It is an object of the invention to provide a device with a battery in which the battery cell dimensions are more determined by the design.

The invention is defined by the independent claims. The dependent claims define advantageous embodiments.

In a first aspect, the invention relates to a device comprising a battery layer on a substrate, wherein a first battery cell is formed in the battery layer and which comprises: i) a first anode, ii) a first cathode, and iii) a first electrolyte arranged between the first anode and the first cathode, wherein the first anode, the first cathode and the first electrolyte have been arranged in the battery layer such that perpendicular projections onto the substrate of each of the first anode and the first cathode are non-overlapping.

The effect of the features of the device in accordance with the invention is that a battery cell is obtained wherein the anode and the cathode are only laterally arranged with respect to each other and that they are confined within a single (battery) layer. A consequence of this is, that the dimensions (thickness) of the anode and the cathode in a direction perpendicular to the substrate are both determined by the thickness of the same (battery) layer, at least as far as their maximum thickness is concerned. These dimensions are typical processing parameters and not a choice for the designer. The remaining two dimensions (length, width of the layers) are both determined by design, and not by processing.

In the known thin-film battery disclosed in U.S. Pat. No. 6,495,283 this is different. In that device the anode, the electrolyte, and the cathode are all manufactured in separate layers, each layer having its own layer thickness (dimension perpendicular to the substrate). Moreover, the effective battery cell dimensions are also determined by the depth of the trench, which is also a dimension which is not determined by a design. Instead, this dimension is determined by processing. Thus, in the known thin-film battery of U.S. Pat. No. 6,495, 283 the problem which the invention aims to solve is even larger in comparison with thin-film batteries on flat substrates. Moreover, U.S. Pat. No. 6,495,283 discloses a battery comprising only one large cell, wherein the layers are extending in the lateral direction for enhancing the battery cell volume and thus the battery capacity. The device according to the invention multiple battery cells may be created by design within the same area, which is a clear advantage of at least some embodiments.

In an embodiment of the device in accordance with the invention the first anode, the first electrolyte, and the first cathode are stacked in a direction parallel to the substrate. The advantage of this embodiment is that the structure gets a stronger lateral topology. A stronger lateral topology implies that the battery cell dimensions perpendicular to the substrate (thickness of anode, cathode and electrolyte) are better determined by the thickness of the battery layer. Expressed differently, the battery cell dimensions are better determined by design.

In an embodiment of the device in accordance with the invention the battery layer has a first surface at a side facing the substrate and a second surface opposite to the first surface, and each one of the first anode, the first electrolyte and the first cathode extend from the first surface of the battery layer to the second surface of the battery layer. In this embodiment the battery cell has a fully lateral topology and also the thickness of the anode, the electrolyte, and the cathode are the same. Expressed differently, in this embodiment the battery cell dimensions are better controlled by design. Another effect of the features of this embodiment is that maximum battery capacity is achieved within the battery layer thickness. Moreover, this structure is very easy to manufacture using conventional processing steps.

In an embodiment of the device in accordance with the invention the first anode and the first cathode of the battery cell are arranged as interleaved fork structures being separated by the first electrolyte. The effect of this feature is that the battery capacity is increased.

In an embodiment of the device in accordance with the invention a second battery cell has been formed in the battery layer, the second battery cell comprising: i) a second anode, ii) a second cathode, and iii) a second electrolyte arranged between the second anode and the second cathode, perpendicular projections onto the substrate of each of the first anode, first cathode, the second anode and the second cathode being non-overlapping. In this embodiment another advantage of the device in accordance with the invention is present. The first battery cell and the second battery cell are arranged in the same layer and both benefit from the earlier described dimension control by design. The fact that both battery cells are located in the same layer opens up the possibility of creating multiple cell arrangements which may be used to either increase the battery capacity or to increase the battery voltage. Another advantage of this embodiment is that the battery cells may be manufactured at the same time, because they are located in the same layer.

In first variant of last mentioned embodiment the first battery cell and the second battery cell have been connected in series. The effect of this feature is that the battery voltage is increased (doubled). In second variant of last mentioned embodiment the first battery cell and the second battery cell have been connected in parallel. The effect of this feature is that the battery capacity is increased.

In an embodiment of the device in accordance with the invention a further battery layer arranged on or above the battery layer, wherein a further battery cell has been formed in the further battery layer, the further battery cell comprising: i) a further anode, ii) a further cathode, and iii) a further electrolyte arranged between the further anode and the further cathode, perpendicular projections onto the substrate of each of the further anode and the further cathode being non-overlapping. Arranging multiple battery cells in the multiple battery layers above each other enables to increase the number of battery cells while keeping the area cost low.

In first variant of last mentioned embodiment the first battery cell and the further battery cell have been connected in series. The effect of this feature is that the battery voltage is increased (doubled). In second variant of last mentioned embodiment the first battery cell and the further battery cell have been connected in parallel. The effect of this feature is that the battery capacity is increased.

In an embodiment of the device in accordance with the invention the substrate has a substantially flat surface. A substantially flat surface of the substrate, onto which the battery layer is provided, helps to achieve a lateral topology of the battery cell.

In a second aspect the invention relates to a method of manufacturing a device in accordance with the invention, the method comprising steps of:

providing a substrate, and
forming a battery layer comprising a lateral stack on the substrate, the lateral stack comprising a first layer, a second layer, and a third layer between the first layer and the second layer, wherein the first layer, the second layer, and the third layer form together a first battery cell, wherein the first layer and the second layer are different from each other and are selected from a group consisting of an anode layer and a cathode layer, and wherein the third layer is an electrolyte layer. The advantages of the method and its embodiments follow that of the corresponding device.

In an embodiment of the method in accordance with the invention the step of forming the lateral stack comprises sub-steps of:

forming the first layer on the substrate with a sidewall extending to the substrate;
forming the third layer laterally adjacent to the sidewall of the first layer, wherein the third layer has a further sidewall on a side opposite to the side facing the sidewall of the first layer, and
forming the second layer laterally adjacent to the further sidewall of the third layer. This is a first group of embodiments and constitutes a convenient method of manufacturing a battery cell with a lateral stack of an anode, an electrolyte, and a cathode.

In an embodiment of the method in accordance with the invention the second layer and the third layer are arranged side-by-side and both formed in a trench which is formed in the first layer. This is a first embodiment of the method for forming a lateral stack of layers. This embodiment features manufacturing of multiple battery cells in the same battery layer at the same time. For this multiple trenches that are spaced apart, have to be formed within the first layer.

In an embodiment of the method in accordance with the invention the second layer is formed in a first trench which is formed in the first layer, and the third layer is formed in a second trench which is formed at the interface between the first layer and the second layer at which is located in at least one of the first layer and the second layer. This is a second embodiment of the method for forming a lateral stack of layers. The advantage of this embodiment is that the forming of the second trench has a mask tolerance equal to half the width of the second trench, provided that the width of the first layer and the second layer is larger than the width of the second trench.

In an embodiment of the method in accordance with the invention the third layer is formed in a first trench in the first layer, and the second layer is formed in a second trench which is formed in the third layer. This is a third embodiment of the method for forming a lateral stack of layers. Also this embodiment features manufacturing of multiple battery cells in the same battery layer at the same time. For this multiple first trenches that are spaced apart, have to be formed within the first layer and multiple second trenches within the third layer in the first trenches (one second trench per third layer in a first trench).

In an embodiment of the method in accordance with the invention the first layer is formed in a first trench in the third layer, and wherein the second layer is formed in a second trench in the third layer. This embodiment is a variant to the first group of embodiments and also features manufacturing of multiple battery cells in the same battery layer at the same time. For this multiple first trenches that are spaced apart, have to be formed within the third layer, and multiple second trenches that are spaced apart and from the first trenches, have to be formed.

In an embodiment of the method in accordance with the invention the aspect ratio of the trench or trenches is equal to or smaller than five. The advantage of this embodiment is that the filling of the trench or trenches is easier.

In a third aspect the invention relates to a system comprising an electronic device and the device comprising the battery layer with the first battery cell, wherein the first battery cell is arranged for supplying power to the electronic device. The device in accordance with the invention which has the function of supplying power to an electronic device has in innumerous number of applications. All such applications are considered to fall within the scope of the invention in case the device in accordance with the invention is used.

In an embodiment of the system in accordance with the invention the electronic device is one of a group comprising: a memory, a sensor, an actuator, a MEMS device, and an RFID. This list of devices is non-exhaustive and indicates important applications of the device in accordance with the invention.

In an embodiment of the system in accordance with the invention the system is a bank-card, a smart-card or a contact-less card.

These and other aspects of the invention are apparent from and will be elucidated with reference to the embodiments described hereinafter.

DETAILED DESCRIPTION OF THE PREFERRED EMBODIMENT

In all commercial thin film batteries (e.g. Cymbet Corporation, Infinite Power Solutions, Oak Ridge Micro-Energy, Inc.) a horizontal thin-film deposited has been used. In some thin film batteries, the total specific surface area has been enlarged by deposition inside trench structures, however also there the deposition is still done by horizontal stacking.

In this invention, the stacking of battery cells is done in a lateral manner using manufacturing methods which in some embodiments have similarities with the damascene filling technique. Manufacturing methods will be elaborated upon in the description of the figures.

In the embodiments of the device of the invention having multiple battery cells, the different battery cells are arranged next to each other and are all fabricated at the same time (since they are situated in the same layer). Since the deposition of all anodes is done at the same time, the fabrication of multi-cells is expected to be much faster and therefore cheaper than for the conventional horizontal stacking. However, in general in this invention the cells are small, but more of them can be produced at the same time.

Throughout this description the term "interconnect layer" should be considered as synonym to "metallization layer" or "metal layer". Both terms are used interchangeably and have to be interpreted as the layer comprising conductors, the insulating layer in which the conductors are embedded, and any vias (=contacts) to underlying layers. These terms are well-known to the person skilled in the art of semiconductor technology and printed-circuit board technology.

Where in this description the word "MEMS" (micro-electromechanical systems) is used, this should also be construed to include NEMS (nano-electromechanical systems). Wherein this description the word deep-submicron process technology is used, this should also be construed to include nanotechnology.

Figure 1:
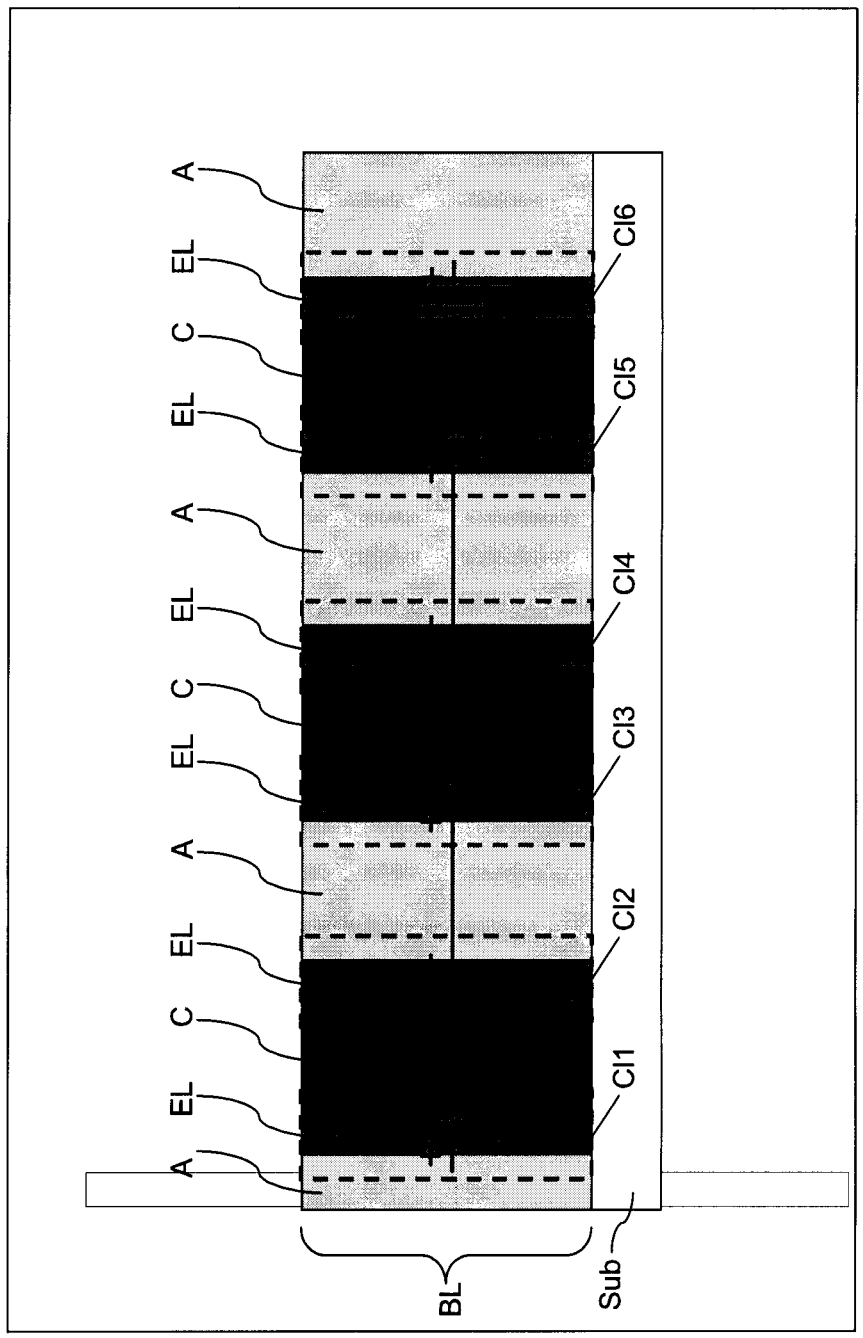
FIG. 1 shows a schematic cross-section of a device comprising a plurality of battery cells in accordance with a first embodiment of the invention.

FIG. 1 shows a schematic cross-section of a device comprising a plurality of battery cells in accordance with a first embodiment of the invention. The device comprises a substrate Sub onto which a battery layer BL has been provided. The battery layer BL comprises a horizontal stack of battery cells Cl1, Cl2, Cl3, Cl4, Cl5, Cl6. Each battery cell comprises an anode A, a cathode C, and an electrolyte EL arranged between the anode A and the cathode C. In order to make the interpretation of the figure easier battery symbols have been added to the figure. The battery cells Cl1, Cl2, Cl3, Cl4, Cl5, Cl6 share their anode A and cathode C with their neighboring battery cells. The arrangement of FIG. 1 is mainly suitable for parallel arrangements of the battery cells. This implies that the anodes A are connected with each other in a plane outside the plane of the cross-section of FIG. 1. Similarly, the cathodes C are connected with each other and the electrolytes EL are connected with each other.

Throughout this description the term substrate should be interpreted very broadly. It may comprise virtually any kind of material, including polymers, metals, semiconductor materials, etc. The substrate may comprise in an active layer at its front-side elements, e.g. transistors, capacitors, resistors, diodes, and inductors, which form the components of an electronic circuit. The substrate may comprise interconnections between the elements which may be laid out in one or more interconnect layers. In the figures, where required, the elements have been left out in order to facilitate the understanding of the invention. The active layer in which transistors, diodes, are formed may also be called a semiconductor body. The semiconductor body may comprise any one of the following semiconductor materials and compositions like silicon (Si), germanium (Ge), silicon germanium (SiGe), gallium-arsenide (GaAs) and other III-V compounds like indium-phosphide (InP), cadmium sulfide (CdS) and other II-VI compounds, or combinations of these materials and compositions. The active elements together may form an electronic circuit. In any case, connection of the active elements is done via interconnect layers. These interconnect layers have parasitic capacitances which are defined by the dielectric constant of surrounding materials. The semiconductor body may even comprise contacts to lower layers (e.g. diffusion regions at the surface of an active region). In any case it is important that the substrate choice is able to withstand the processing conditions of the manufacturing the battery cells (temperature, pressure, use of etchants, etc).

Figure ' shows a device with six battery cells. This is just an example, the number of battery cells may be any positive number equal to or larger than "1".

It is important to note that the invention relates to the arrangement of the different elements of a battery cell rather than the choice for specific battery materials or dimensions. Battery technology, and in particular thin film battery technology is considered to be well-know to the person skilled in art. The choice for anode, cathode, and electrolyte materials, and the dimensioning of the battery depends on the needs determined by the application. Depending on these needs the designer may choose from a large list of possible materials, and he may choose the right dimensions for the anode, the cathode, and the electrolyte. A very important reference with a nice overview of materials and dimensions for thin film batteries is the following: "J. Kawamura et al., *Thin Film Batteries*", Solid State Ionics for Batteries (preprint), ed. T. Minami, Springer-Verlag, Tokyo (2005), p. 64-72". This document is hereby incorporated by reference.

Despite battery technology being well known, example materials and dimensions will be given where it helps to interpret and repeat the invention. Table 1 in last abovementioned publication of J. Kawamura et. al. gives a clear overview of possible material combinations and resulting battery voltages. A conventional lithium ion battery has a negative electrode comprising an active material which releases lithium ions when discharging and intercalates or absorbs lithium ions when the battery is being charged. The positive electrode of a lithium ion battery comprises an active material of a different nature, one that is capable of reacting with lithium ions on discharge, and releasing lithium ions on charging the battery. In some of the conventional lithium ion batteries the negative electrode is separated from the positive electrode by a perforated or microporous membrane or continuous layer, made of some suitable organic polymer. The external faces of the electrodes are usually equipped with some means to collect the charge generated by the battery during discharge, and to permit connection to an external power source during the recharging of the lithium ion battery. The current collectors are usually made of stainless steel, iron-nickel alloys, copper foil, aluminum and similar relatively inexpensive metals. The conventional lithium ion battery also comprises a lithium ion containing electrolyte, which may be either a non-aqueous liquid or a solid organic polymer, the lithium ion therein being supplied by dissociation of a lithium salt dissolved in the electrolyte. An exemplary lithium ion battery is described in U.S. Pat. No. 5,187,033, issued to N. Koshiba on Feb. 17, 1993. This document is hereby incorporated by reference.

There are many different methods of manufacturing a structure with a lateral stack of layers as presented in FIG. 1. One possible method comprises so-called inkjet printing. Such inkjet printing steps may replace deposition steps in the methods illustrated in the figures. In some case they also replace the patterning steps. More information about ink-jet printing can be found in the following reference: "Materials World, July 2003, Vol. 11, No. 7, p. 14-16". It is not unlikely that other methods of manufacturing such a structure exist or will be found. All such methods are considered to fall within the scope of the invention as described in the claims. A very attractive method of manufacturing a device with battery cells as presented in FIG. 1 is a combination of layer deposition steps with lithographic processing steps. These steps on themselves are well known from semiconductor process technologies, and in particular from the back-end-of-line stage thereof. In this description with the back-end-of-line stage is meant the stage of the IC processing in which interconnect/metallization and dielectrics are made. The difference however is that different materials, i.e. battery layer materials, are used instead of interconnect and dielectric materials. To that extend the invention introduces a complete new fabrication method in the field of batteries.

Figure 2:
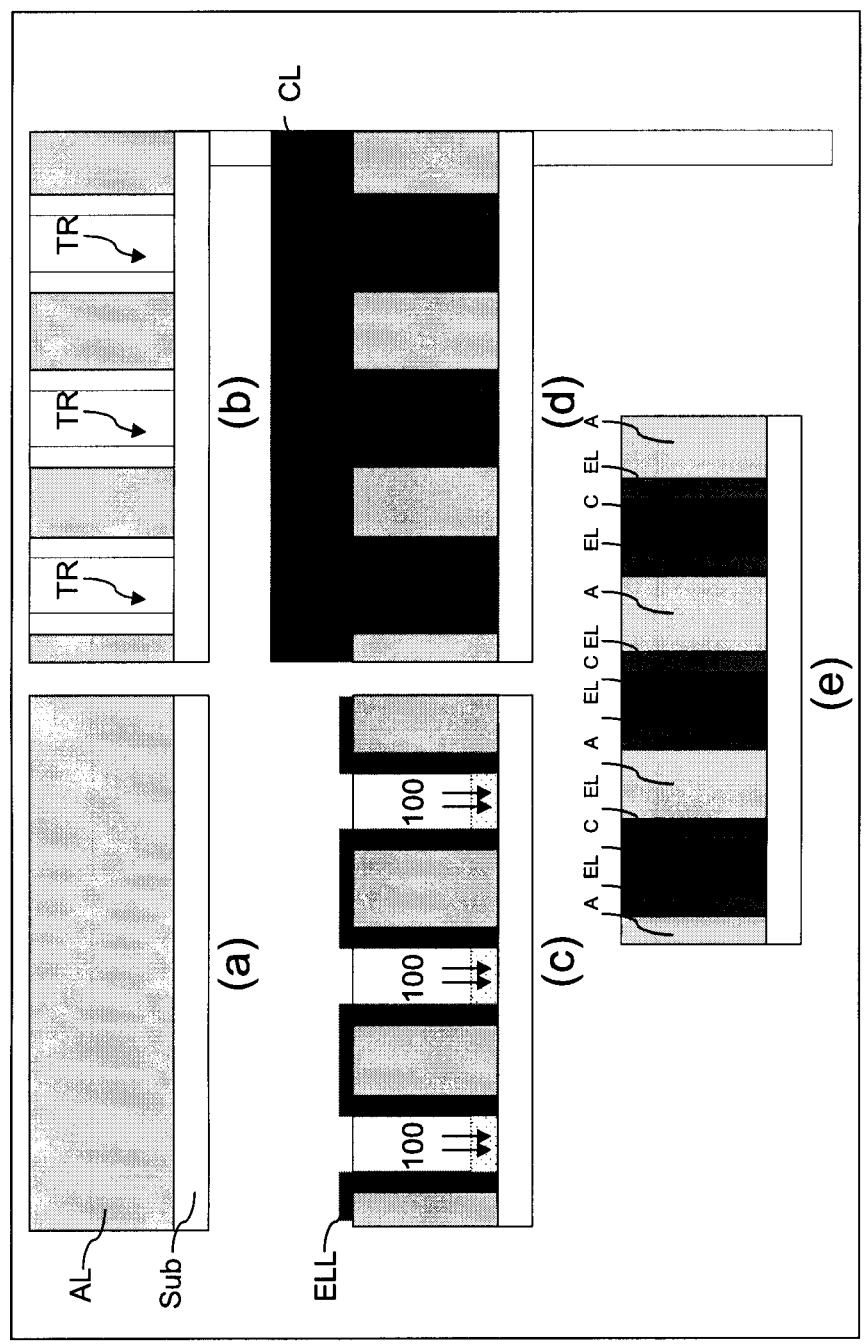
FIGS. 2(a) to 2(e) show different stages of a first embodiment of a method of manufacturing the device of FIG. 1.

FIGS. 2($a$) to 2($e$) show different stages of a first embodiment of such method of manufacturing the device of FIG. 1. The method constitutes a method in which photolithography and (dry) etching are combined. The details mentioned for the process steps in this figure are also applicable to the methods illustrated in other figures, unless mentioned otherwise.

In the stage illustrated in FIG. 2($a$) a substrate is provided onto an anode layer AL is deposited. The anode material can be lithium (in the case of a lithium-based battery) or any other redox-metal (see the earlier mentioned reference for more possible materials). The deposition may be done in various way including sputtering, chemical vapor deposition (CVD), physical vapor deposition (PVD), spin-coating or screen printing. Screen printing is a technique which is well-known to the person skilled in the art. Layer deposition techniques are well-known to the person skilled in the art. As mentioned earlier in this description, the substrate Sub may comprise virtually any kind of material. However, the upper part of the substrate Sub that is in contact must be either a bad conductor (including semiconductors) or an insulator. Otherwise the battery cells to be formed are short-circuited. Also, the substrate should be resistant to subsequent processing conditions.

In the stage illustrated in FIG. 2($b$) trenches TR are patterned. This may be done using standard photolithography, followed by an etching step (i.e. dry-etching). A lateral structure of the battery cell is only obtained if the trenches TR extend fully through the anode layer AL until the substrate Sub. In order to achieve this result the etching may be carried out such that it automatically stops at the underlying substrate Sub. Alternatively, it may be carried out in a timed fashion such that the process is stopped when the substrate Sub is reached. In this step the anodes A of the battery cells are defined. Etching techniques are well-known to the person skilled in the art.

In the stage illustrated in FIG. 2($c$) an electrolyte layer ELL is deposited on the structure, which covers the anodes A as well as all walls and bottoms of the trenches. The electrolyte layer ELL may be deposited in various ways including PVD, CVD or sputtering. In this step it is essential that the bottom of the trench is not coated with electrolyte material. The latter can be achieved by performing an etch-back step (using etching chemistry 100) after deposition, or by physical resputtering of the electrolyte material onto the sidewalls. Physical resputtering is a technique wherein material from a bottom of a trench is removed and re-deposited on the sidewall of the trench. This may be achieved by carrying out a sputtering step (e.g. with Argon-ions). The electrolyte is typically LiPON (in the case of lithium-based batteries), but it could be any material which allows positive ions to move from one electrode to the other.

In the stage illustrated in FIG. 2($d$) a cathode layer CL is deposited. The cathode material can be $LiCoO_2$ (in the case of a lithium-based battery) for example. The deposition may be done in various ways including PVD, CVD. The cathode layer CL overfills the remaining trench structures.

In the stage illustrated in FIG. 2(e) the excess cathode material and possibly also remaining electrolyte material) is removed. In the case of only cathode material removal an etch-back and/or chemical mechanical planarization (CMP) may be used. When also electrolyte material needs to be removed, only a CMP step is preferably used. LiCoO2 or other Li-based compounds can be etched in tri-methyl ammonium hydroxide (TMAH). This step completes the formation of the cathode C and the electrolyte EL.

Afterwards the step of FIG. 2(e) the structure can be passivated using a hermetic capping layer (not shown). This capping layer may be an epoxy-resin for example. In the case of silicon wafers, the backside of the wafer can be grinded in order to thin down the substrate and make the structure flexible which is required for some applications.

As already mentioned earlier, the dimensions of the battery cells may vary heavily and depend upon the application and designer needs. Nevertheless, typical dimensions are as follows. The widths (dimension parallel to substrate and in the plane of the cross-section) of the anode A and cathode C are typically in the range of 1 μm to 10 μm. The width of the electrolyte EL (defined by the thickness of the electrolyte layer) is typically also in the same range. As a consequence of this the width of the trenches TR has to be in the range 3 μm to 30 μm. The thickness of the anode A and cathode C (mainly defined by the thickness of the original anode layer AL) are determined by the aspect ratio (AR). The aspect ration is preferably below five (i.e. range: 1 to 5), because of filling properties. This results in a typically range for the thickness of 1 μm (AR=1, W=1) to 50 μm (AR=5, W=10), The method illustrated in FIGS. 2(a) to 2(e) shows some similarity with damascene processing known from interconnect IC processing as far as the formation and filling of trenches is concerned. Materials are completely different however. The advantage of this method is that multiple battery cells can be produced at the same time.

The method may also be carried out on flexible substrates using roll-to-roll techniques, wherein the different steps (lithography, ink-jet printing, sputtering, etc.) are carried out at different locations along the path. Expressed differently, a flexible substrate (foil) is transport from a first roll to a second roll. Then, at a first location the first step may be carried out, and at a second further location the second step is carried out, etc.

FIGS. 3(a) to 3(f) show different stages of a second embodiment of a method of manufacturing the device of FIG. 1. The details mentioned for the process steps in this figure are also applicable to the methods illustrated in other figures, unless mentioned otherwise. This method will be discussed in as far as it differs from the method of FIGS. 2(a) to 2(e).

Figure 3:
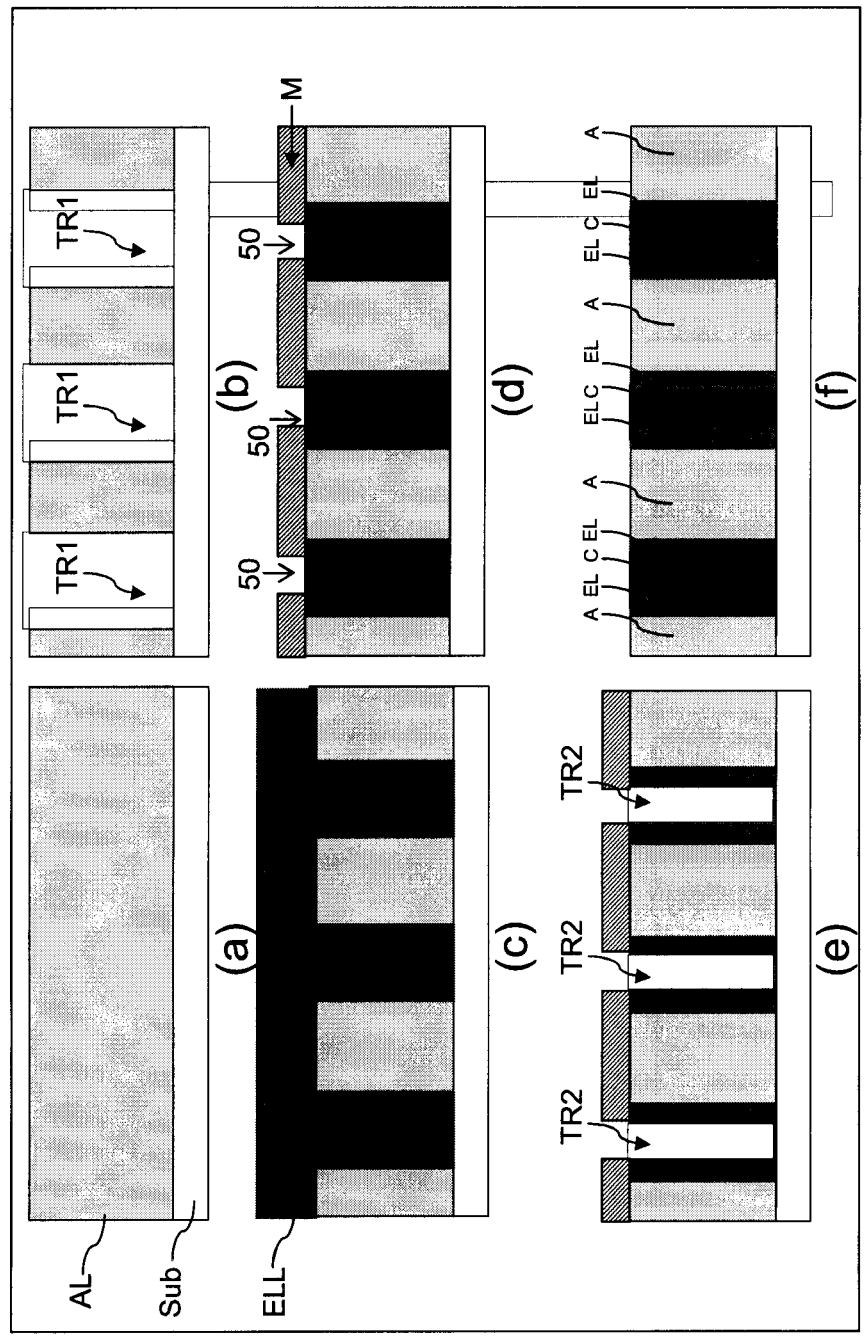
FIGS. 3(a) to 3(f) show different stages of a second embodiment of a method of manufacturing the device of FIG. 1.

The stage as illustrated in FIG. 3(a) is the same as the stage illustrated in FIG. 2(a). The stage illustrated in FIG. 3(b) is the same as the stage illustrated in FIG. 2(b). However, trenches formed in this stage are the first trenches TR1 to be formed in the flow. This step completes the formation of the anodes A.

In the stage illustrated in FIG. 3(c) also an electrolyte layer ELL is deposited just like in FIG. 2(c). However, in this method the electrolyte layer ELL completely overfills the first trenches TR1.

In the stage illustrated in FIG. 3(d) the excess electrolyte material is removed first, i.e. by etching or CMP, and then a patterned masking layer M is provided having openings 50 located above the electrolyte layer ELL in the first trenches TR1. The patterned masking layer M may be a photoresist for example. Photolithography, including the use of pattern masking layers is well-known to the person skilled in the art.

In the stage illustrated in FIG. 3(e) second trenches TR2 are formed that extend to the substrate. This step completes the formation of the electrolytes EL.

In the stage illustrate in FIG. 3(f) the second trenches TR2 are filled with an cathode layer such that it overfill the second trenches TR2, where after the excess cathode material is removed. This step completes the formation of the cathodes C.

The methods as illustrated in FIGS. 2(a) to 2(e) and FIGS. 3(a) to 3(f) may be changed in many ways. For example the order of forming the anode, cathode, and electrolyte may be changed. In the earlier description, references to anode layer AL and cathode layer CL may be exchanged. The resulting structure will have the same topology. Another example variation is that in the first stage an electrolyte layer ELL is provided, wherein trenches are patterned for forming the anode and cathode. Coming up with such variations is considered to fall within the routine of the person skilled in art if he is given the task of making a lateral stack of layers as presented in FIG. 2(e) and FIG. 3(f). Nevertheless, it is the inventive contribution of the inventors to realize that it is interesting to make a lateral stack.

Figure 4:
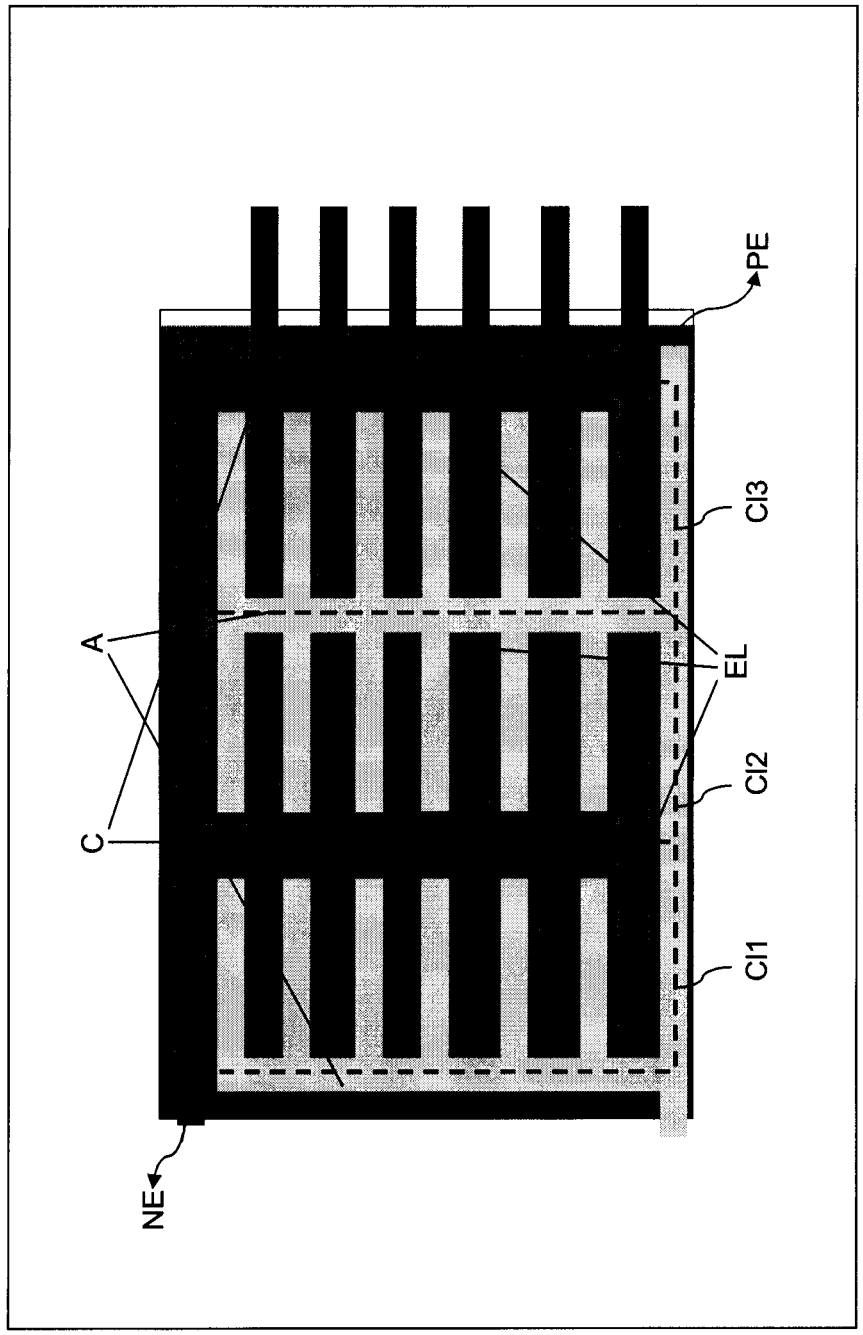
FIG. 4 shows a schematic top-view of a device comprising a plurality of battery cells in accordance with a second embodiment of the invention.

FIG. 4 shows a schematic top-view of a device comprising a plurality of battery cells in accordance with a second embodiment of the invention. This figure illustrates how the battery capacity can be increased. By way of example only three battery cells Cl1, Cl2, Cl3 have been illustrated. However, the structure may be designed to expand in all directions.

The battery capacity is limited by the available volume or the cell. Therefore, the battery capacity can be increased by increasing its dimensions. In the device in accordance with the invention the length and the width of the cells are determined by design. However the thickness of the cell can be controlled by technology (an AR exceeding 5 is however not easy to make). The anode A and the cathode have been arranged as interleaved fork structures spaced apart by the electrolyte EL. In the arrangement in FIG. 4 the anodes A are all connected together, and the cathodes C are all connected together. In this way a parallel arrangement of the battery cells Cl1, Cl2, Cl3 is obtained. The arrangement in FIG. 4 increases a contact interface between the cathode C and electrolyte EL and the anode A and electrolyte EL, and simultaneously increases the amount of electrode per unit area. The anodes A are connected to a positive battery electrode PE of the battery, and the cathodes C are connected to a negative battery electrode NE. These connections may comprise current collectors (not shown) provided thereon. The current collectors serve to reduce the sheet-resistance of the connections as well as the contact resistance for external connections.

As an alternative to interleaved fork structure also other shapes (nested circles, nested rectangles, etc) are possible. Even asymmetric arrangements (in the sense that the anode-electrolyte interface and the cathode-electrolyte interface are different) are feasible.

Figure 5:
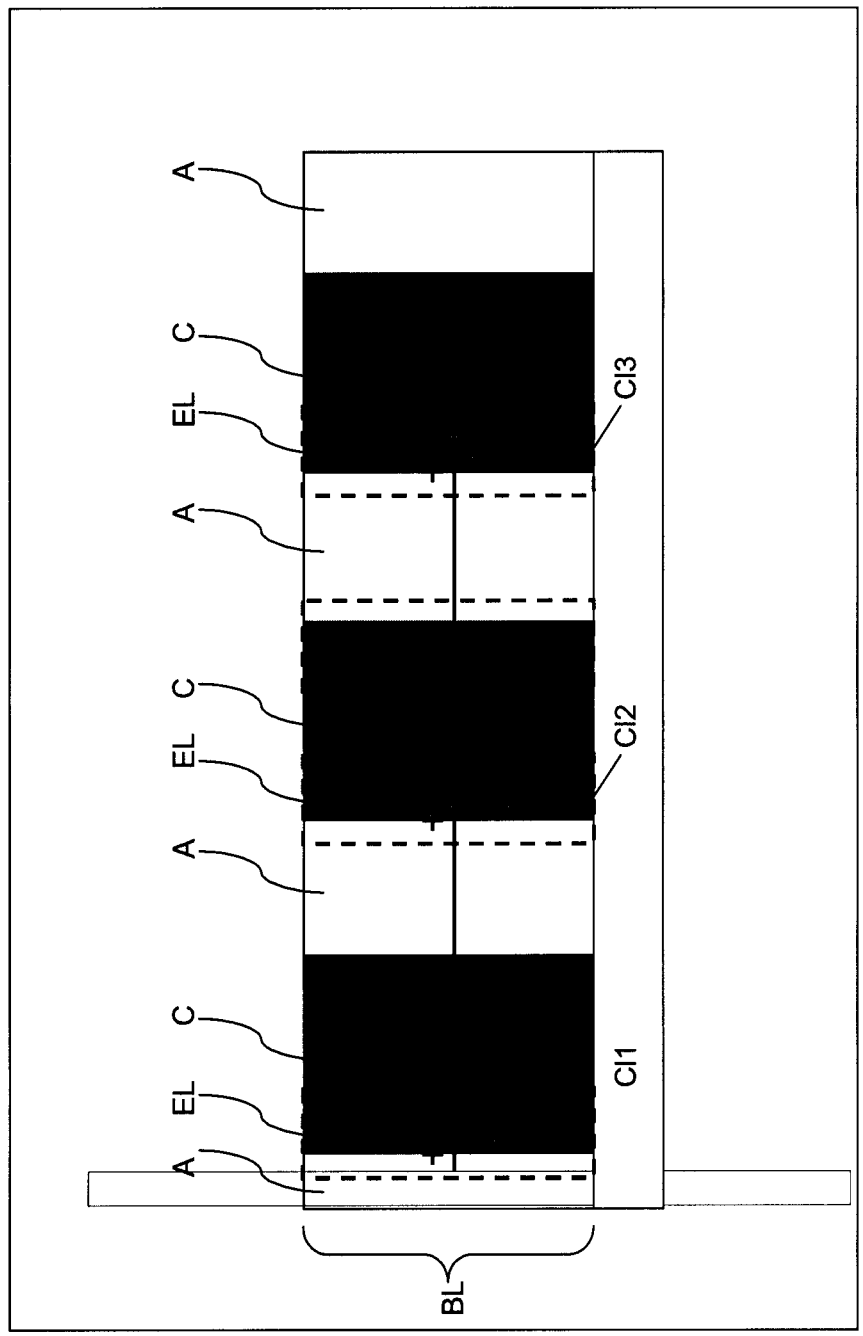
FIG. 5 shows a schematic cross-section of a device comprising a plurality of battery cells in accordance with a third embodiment of the invention.
Figure 6:
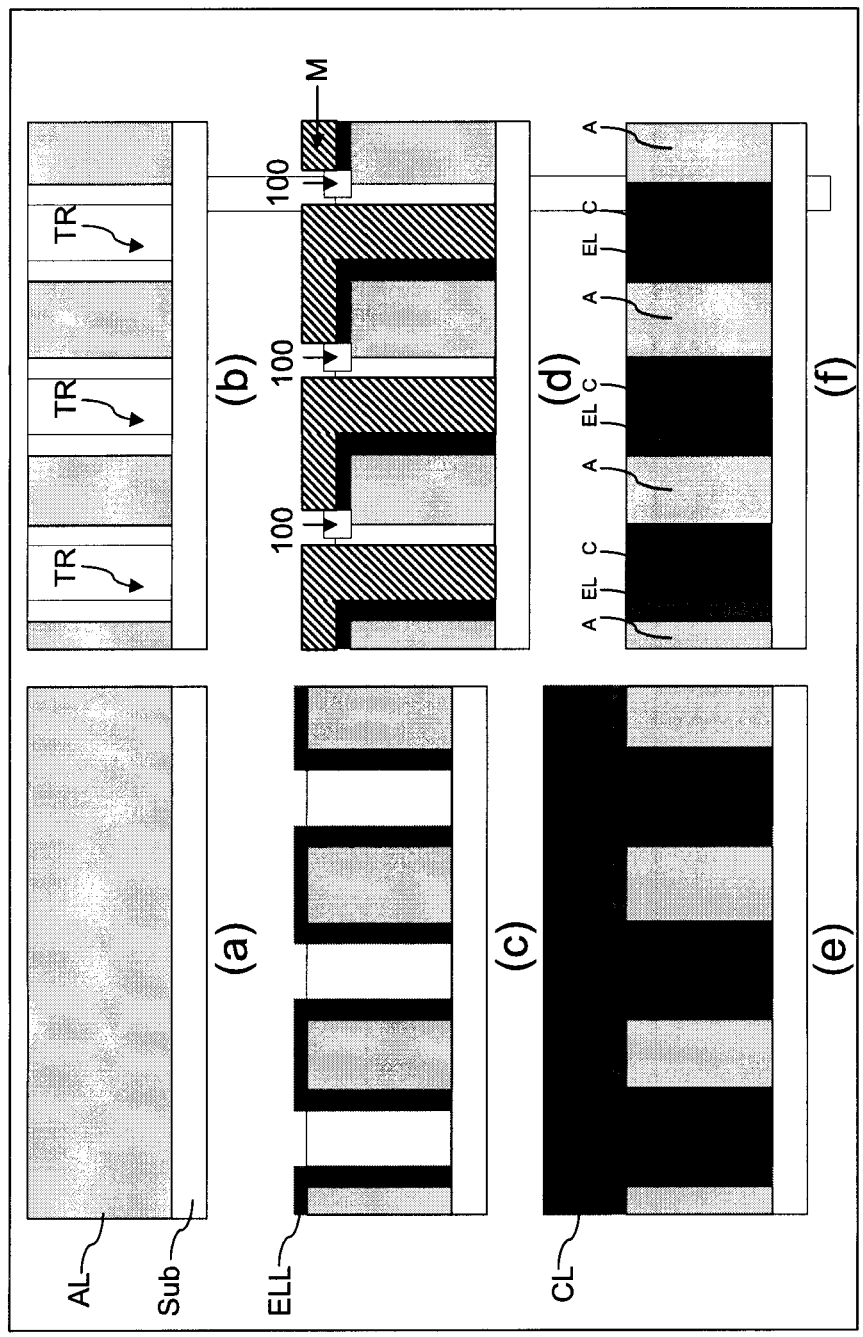
FIGS. 6(a) to 6(f) show different stages of a first embodiment of a method of manufacturing the device of FIG. 5.

FIG. 5 shows a schematic cross-section of a device comprising a plurality of battery cells in accordance with a third embodiment of the invention. The device comprises a substrate Sub onto which a battery layer BL has been provided. The battery layer BL comprises a horizontal stack of battery cells Cl1, Cl2, Cl3. Each battery cell comprises an anode A, a cathode C, and an electrolyte EL arranged between the anode A and the cathode C. In order to make the interpretation of the figure easier battery symbols have been added to the figure. Contrary to the first embodiment, the battery cells Cl1, Cl2, Cl3 do not share their anode A and cathode C with their neighboring battery cells. Instead, the arrangement provides for serial arrangement of battery cells. Connecting the battery cells Cl1, Cl2, Cl3 leads to a higher battery voltage.

Just like as for the device of FIG. 1 there are many different ways of manufacturing the structure of FIG. 5. The same remarks as made for that embodiment apply.

FIGS. 6(a) to 6(f) show different stages of a first embodiment of a method of manufacturing the device of FIG. 5. This method is to a very large extent the same as the method illustrated in FIGS. 2(a) to 2(e). It will be discussed only in as far as it differs from the method of FIGS. 2(a) to 2(e). The main difference relies in that before the step of FIG. 2(d) (=FIG. 6(e)) the electrolyte layer ELL is partially removed using a patterned masking layer M. For this step a planarizing photoresist layer is first deposited onto the structure which is subsequently patterned. Alternatively, also a bi-layer resist or BARC-resist combination can be used, where a first photoresist layer of the photoresist layer stack is used for planarizing the topography. Then the electrolyte layer ELL is anisotropically and selectively etched (to the electrolyte material) under masking of the masking layer M. In order to obtain some mask tolerance in this processing step, the openings of the masking layer have to extend over the formed anodes A. In this way not only the electrolyte layer ELL on a sidewall of the trench TR is removed, but also part of the electrolyte layer ELL on the anode A. It is not essential that the etching step is selective to the electrolyte material ELL. However, if it is not selective also part of the anode A will be removed. The removal of the electrolyte layer ELL on one side of the trench TR will make sure that in the subsequent step on one side of the trench TR the cathode material will be formed next to anodes without an electrolyte EL in between thus establishing a serial arrangement of battery cells.

FIGS. 7(a) to 7(f) show different stages of a second embodiment of a method of manufacturing the device of FIG. 5. This method will be discussed in as far as it differs from the previously discussed embodiments. The first two stages of the method are the same as the first two stage of the method of FIGS. 2(a) to 2(e). However, trenches formed in the first stage are the first trenches TR1 to be formed in the flow. This step completes the formation of the anodes A.

Figure 7:
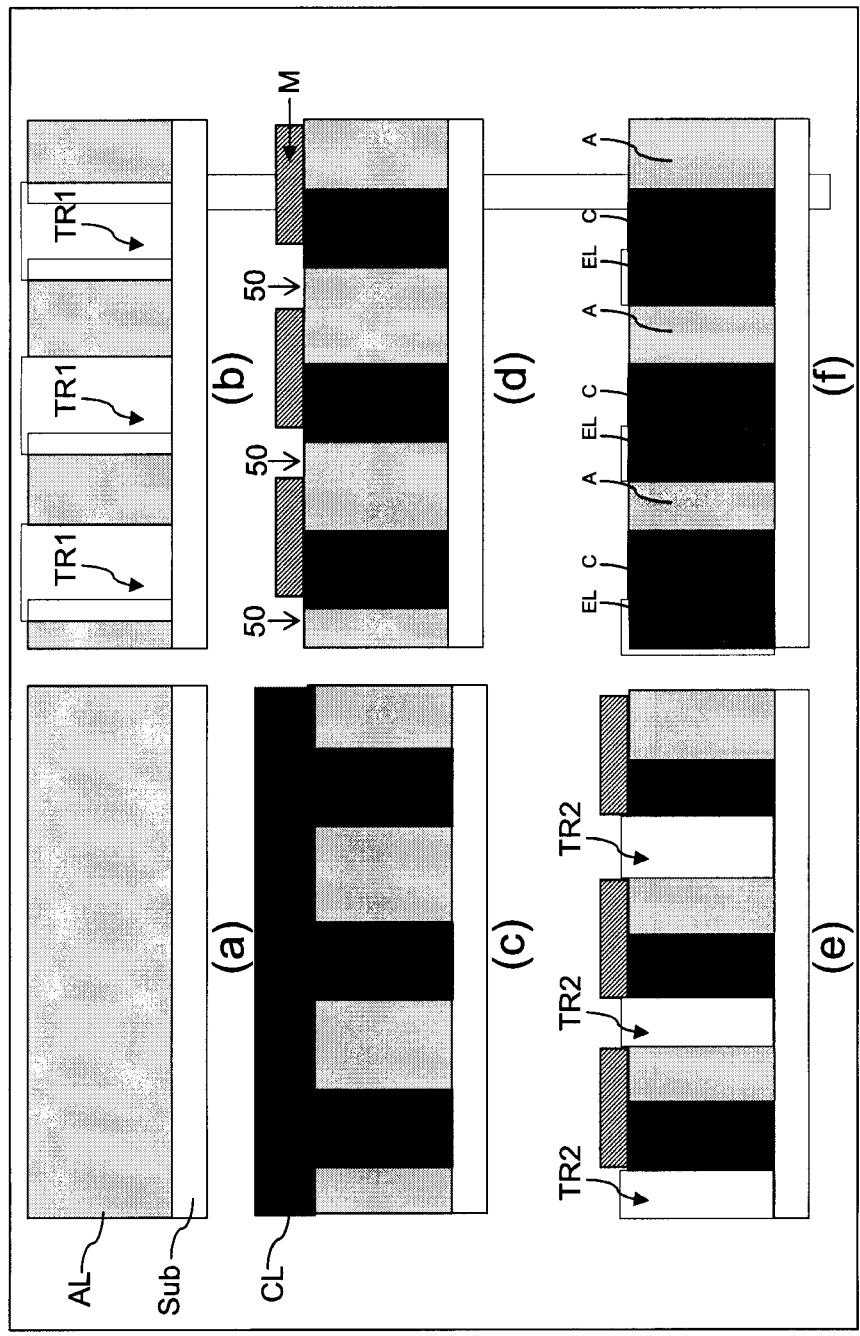
FIGS. 7(a) to 7(f) show different stages of a second embodiment of a method of manufacturing the device of FIG. 5.

In the stage illustrated in FIG. 7(c) a cathode layer CL is deposited on the structure instead of an electrolyte layer ELL. The cathode layer CL overfills the first trenches TR1. Subsequently the excess cathode material is removed, for example with an etch step or a CMP step.

In the stage illustrated in FIG. 7(d) a patterned masking layer M is provided having openings 50 which are located above the interfaces between the anode A and the cathode C. These openings 50 define the locations of the electrolytes EL to be formed. In this embodiment of the method the locations are chosen such that not all interfaces are exposed. In this way a serial arrangement of battery cells is achieved. In case a parallel arrangement of the battery cells is desired, the openings must be present above substantially all interfaces. This constitutes just a minor difference in the method (only requires a different masking layer M). A serial battery arrangement is only obtained if the openings are above the interface, such that in the subsequent removal cathode material and/or anode material adjacent the interface is removed. When the opening is spaced apart from the interface, electrolytes EL will be formed completely within anode and or cathode material. This then does not result in a battery configuration requiring different materials for the anode A and cathode C.

In the stage illustrated in FIG. 7(e) second trenches TR2 are formed using an etch step under masking of the masking layer M. This step completes the formation of the cathodes C and the anodes A.

In the stage illustrated in FIG. 7(f) the second trenches TR2 are overfilled with an electrolyte layer ELL. Subsequently, excess electrolyte material is removed using an etch step or a CMP step.

The method illustrated in FIGS. 7(a) to 7(f) does not require an anisotropic selective etch step, which is required in the method illustrated in FIGS. 6(a) to 6(f). This makes the method less difficult. However, this is at the cost of one additional masking step.

Figure 8:
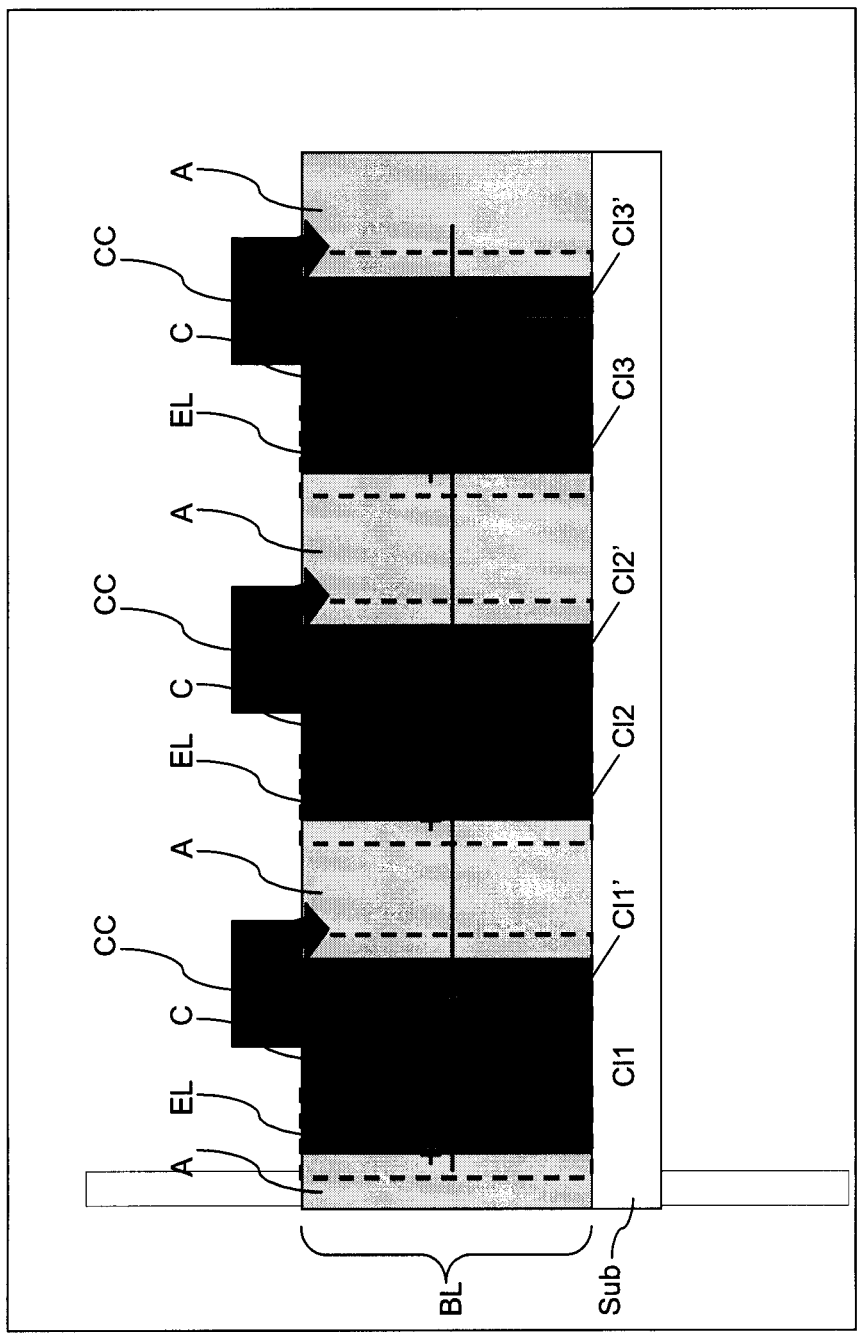
FIG. 8 shows a schematic cross-section of a device comprising a plurality of battery cells in accordance with a fourth embodiment of the invention.

Whereas, the embodiment of the device in FIG. 5 requires slightly more complex processing to obtain the serial arrangement FIG. 8 shows a schematic cross-section of a device comprising a plurality of battery cells in accordance with a fourth embodiment of the invention. In order to make the interpretation of the figure easier battery symbols have been added to the figure. In this device also a serial arrangement of battery cells Cl1, Cl2, Cl3 is obtained, although in manner different from the embodiment of FIG. 5. As a matter of fact the structure is very similar to the embodiment of FIG. 1, except for the fact that some battery cells Cl1', Cl2', Cl3' have been short-circuited by a current collector CC. The current collectors are provided on top of the battery layer BL. The current collectors CC can be made of platinum, stainless steel, iron-nickel alloys, copper foil, aluminum and similar materials.

Figure 9:
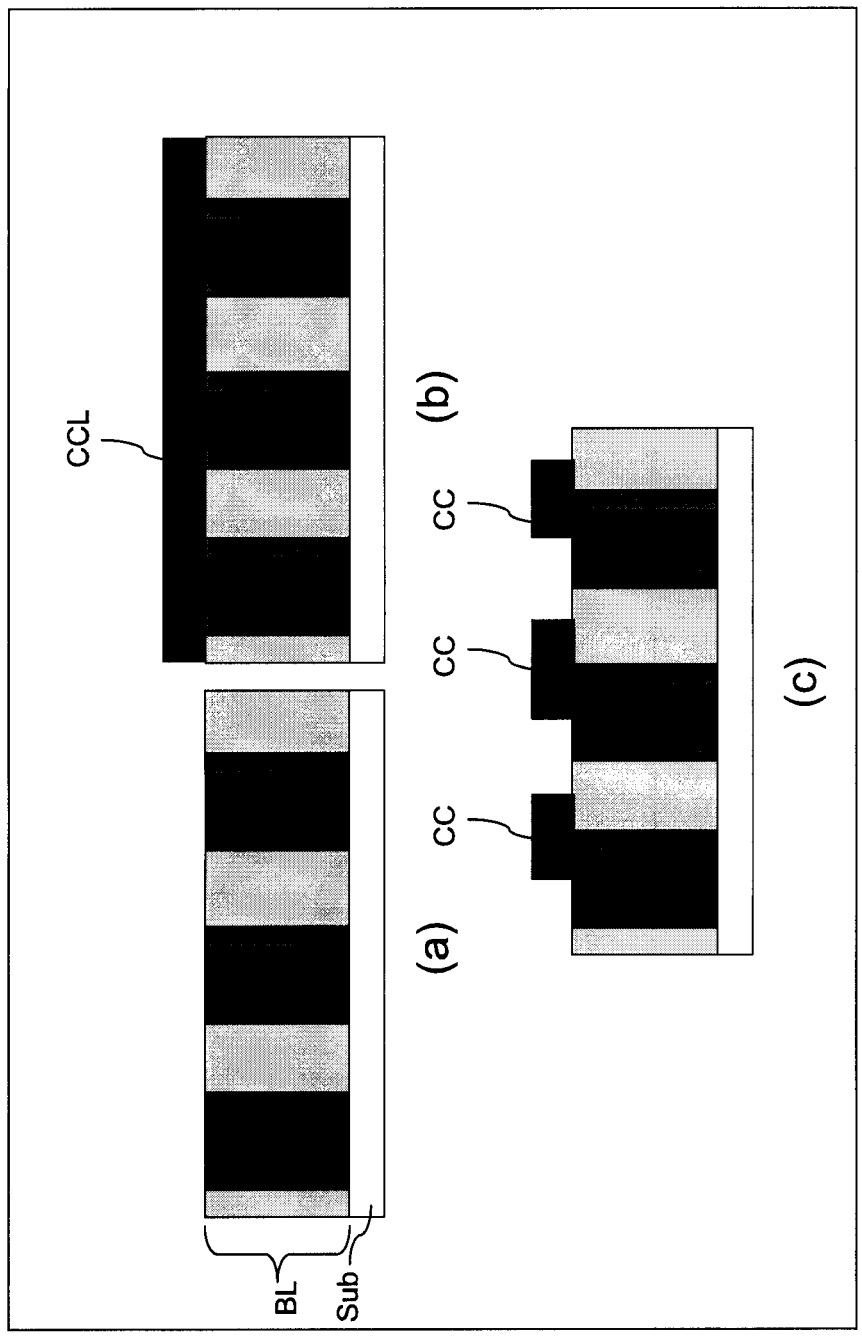
FIGS. 9(a) to 9(c) show different stages of another embodiment of a method of manufacturing the device of FIG. 8.

FIGS. 9(a) to 9(c) show different stages of another embodiment of a method of manufacturing the device of FIG. 8. As the core of the structure of FIG. 8 resembles that of FIG. 1, the first steps of a method of manufacturing such device can be the same. The first stages of the method are illustrated in FIGS. 2(a) to 2(e). The stage of FIG. 9(a) is the same as that of FIG. 2(e).

In the stage of FIG. 9(b) a current collector layer CCL is deposited on the battery layer. Conventional techniques as already discussed in this description may be used. In the stage of FIG. 9(c) the current collector layer CCL is patterned, i.e. by using photolithography followed by an etching step.

Figure 10:
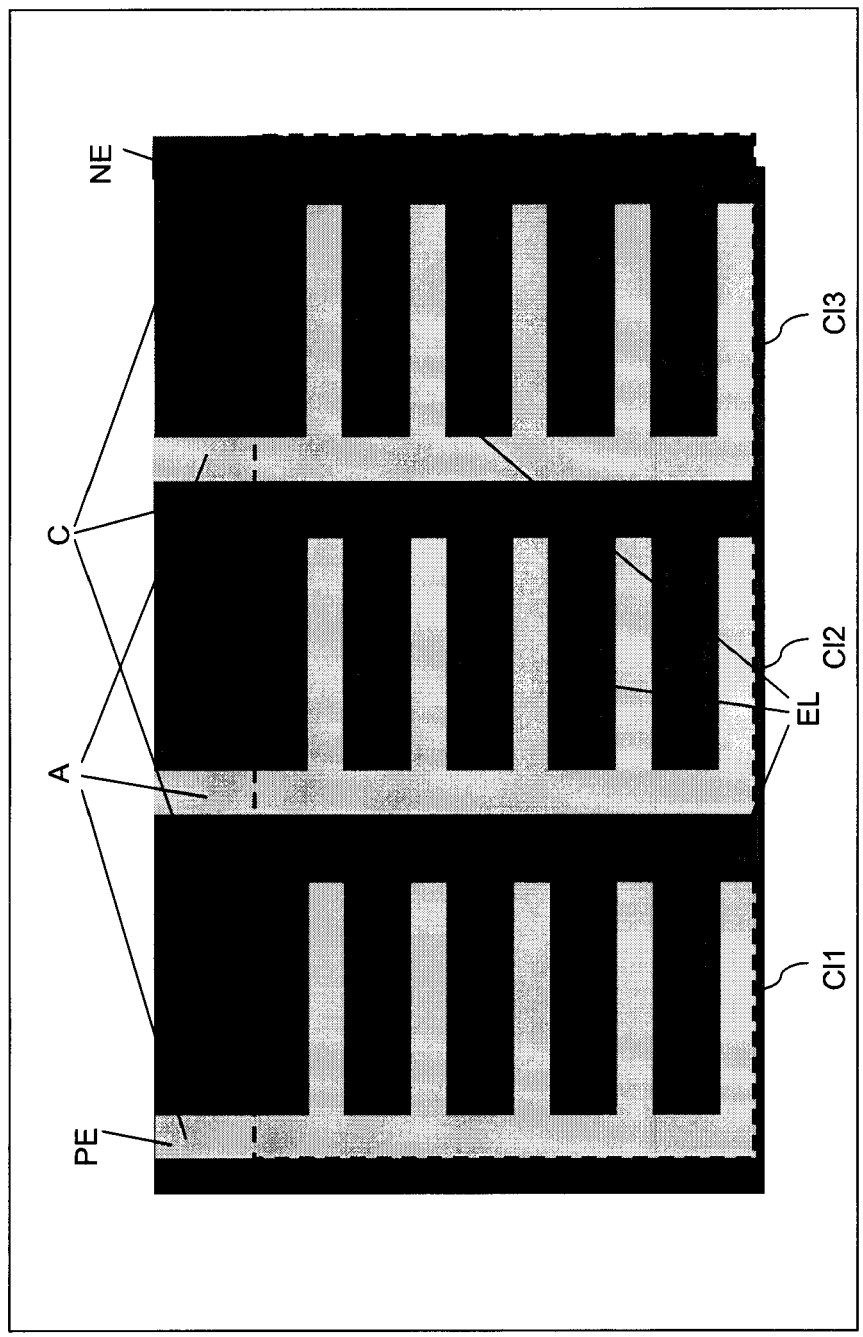
FIG. 10 shows a schematic top-view of a device comprising a plurality of battery cells in accordance with a fifth embodiment of the invention.

FIG. 10 shows a schematic top-view of a device comprising a plurality of battery cells in accordance with a fifth embodiment of the invention. The figure will be mainly discussed in as far as it differs from the embodiment of FIG. 4. This figure illustrates how the battery capacity can be increased similar to the embodiment of FIG. 4. By way of example only three battery cells Cl1, Cl2, Cl3 have been illustrated. However, the structure may be designed to expand in all directions. The anode A and the cathode have been arranged as interleaved fork structures spaced apart by the electrolyte EL. In the arrangement in FIG. 10 the anodes A are in contact with electrolyte EL on one side, and with a cathode C on the other side. The same holds for the cathode C. In this way a serial arrangement of the battery cells Cl1, Cl2, Cl3 is obtained. The arrangement in FIG. 10 increases a contact interface between the cathode C and electrolyte EL and the anode A and electrolyte EL, and simultaneously increases the amount of electrode per unit area.

Figure 11:
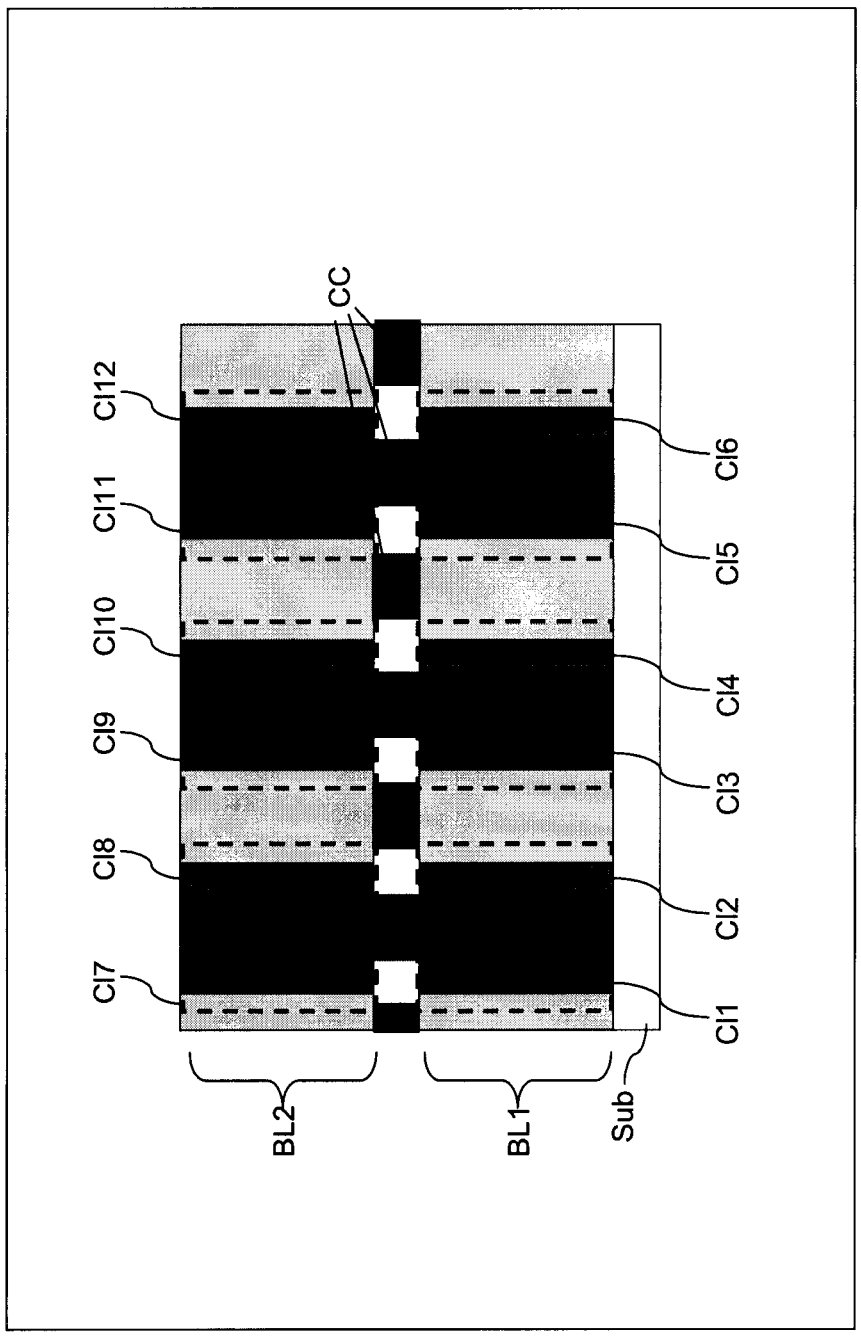
FIG. 11 shows a schematic cross-section of a device comprising a plurality of battery cells in accordance with a sixth embodiment of the invention.

FIG. 11 shows a schematic cross-section of a device comprising a plurality of battery cells in accordance with a sixth embodiment of the invention. This embodiment illustrates another advantage of the device in accordance with the invention. A plurality of devices in accordance with the invention may be stacked, which is another way of increasing the battery capacity. Stacking is very easy because of the planarity of the structure. This stacking may serve the purpose of putting more battery cells in parallel as is the case in FIG. 11 or, alternatively, to put them in series. Connections between the plurality of battery cells Cl1, Cl2, Cl3, Cl4, Cl5, Cl6, Cl7, Cl8, Cl9, Cl10, Cl11, Cl12, which are distributed over a first battery layer BL1 and a second battery layer BL2, can be made by using the current collectors CC as discussed in the accompanying description of FIG. 9. In the method (which is a mere cascading of the methods already discussed) of manufacturing the structure of FIG. 11 it may be desired to fill up the gaps between the current collectors CC with insulating material or electrolyte material.

Figure 12:
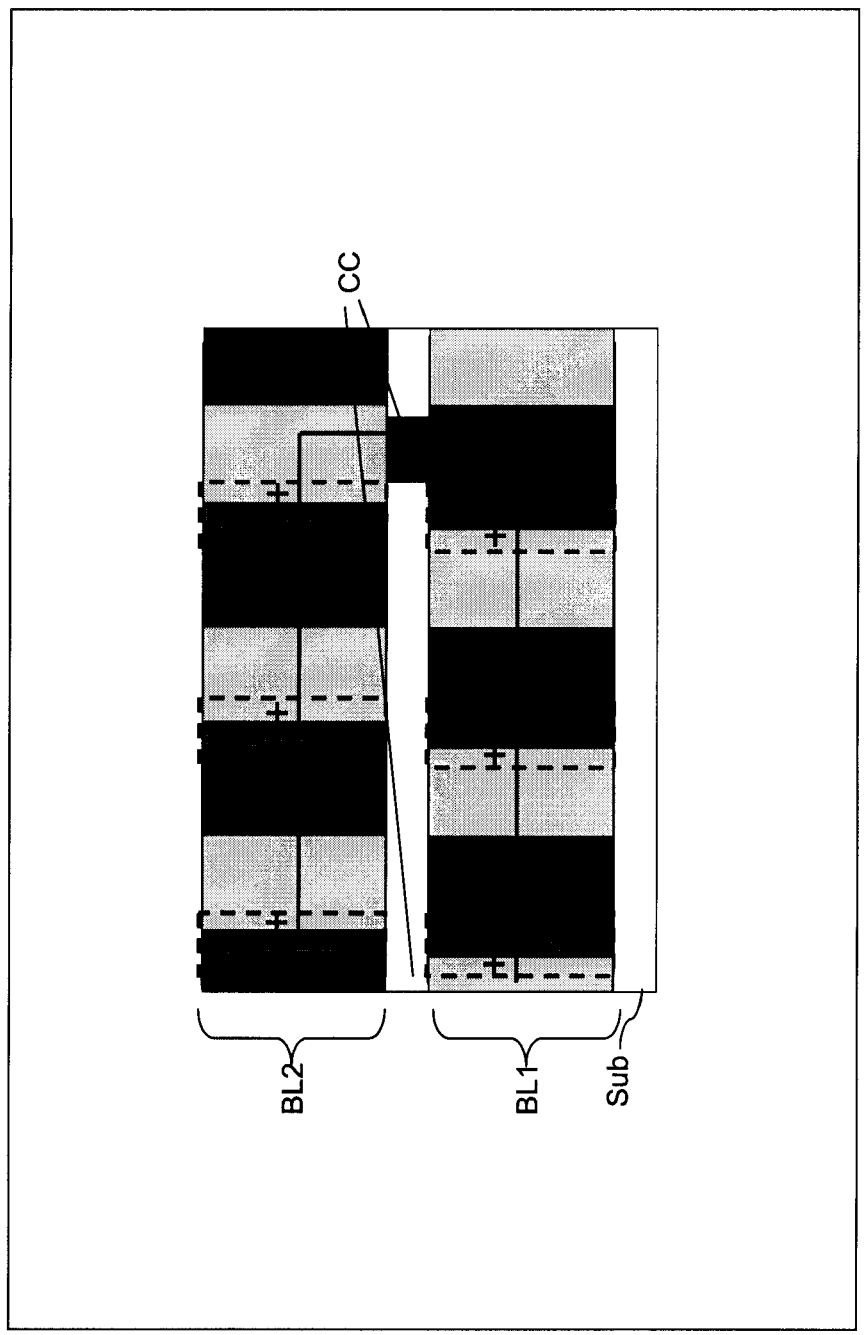
FIG. 12 shows a schematic cross-section of a device comprising a plurality of battery cells in accordance with a seventh embodiment of the invention.

FIG. 12 shows a schematic cross-section of a device comprising a plurality of battery cells in accordance with a seventh embodiment of the invention. Additional to exploiting the third dimension for parallel arrangement of battery cells, it may also be exploited for creating a serial arrangement of battery cells. This is illustrated in FIG. 12. The embodiments of FIGS. 11 and 12 may also be combined such that both an increased battery voltage as well as an increased battery capacity is achieved.

Next to the embodiments of the device illustrated in FIGS. 11 and 12, it is also possible to design a plurality of battery cells next to each other (each battery cell using 1 or more battery layers) or above each other (each battery cell located in a different layer) which have different battery voltage and/or battery capacity. In this way an array of battery cells is provided which may advantageously used in an application requiring more than one battery.

The invention provides for a lateral battery configuration which has as major advantage that battery dimensions are better determined by the design like length and width of layers. In the known device the known devices the battery dimensions are more determined by technology parameters like layer thickness, and trench depth.

The invention, which may be summarized as integrated lateral battery, may be applied in a wide variety of application areas, for example in memory cards, sensor and/or actuator systems (e.g. MEMS devices), active RFID, bank-cards, smart-cards, contact-less cards, etc.

Various variations of the semiconductor device and electronic system in accordance with the invention are possible and do not depart from the scope of the invention as claimed. These variations for example relate to material choice, layer thickness, spatial arrangement of the elements, etc. Also, in the method of manufacturing a device with a battery cell in accordance with an embodiment of the method of the invention, many alterations are possible. Such alterations fall within the normal routine of the person skilled in the art and do not deviate from the inventive concept here disclosed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A device comprising:
a battery layer on a topmost surface of a substrate, wherein no other portion of the substrate is positioned over the topmost surface of the substrate, wherein a first battery cell is formed in the battery layer, the first battery cell including:
a first anode;
a first cathode; and
a first electrolyte arranged between the first anode and the first cathode, and
wherein each one of the first anode, the first electrolyte, and the first cathode have a bottommost surface physically contacting the topmost surface of the substrate, wherein the first anode, the first cathode, and the first electrolyte have substantially coplanar top surfaces that face away from the topmost surface of the substrate, and
wherein the battery layer further includes another anode associated with another battery cell, the another anode having a bottommost surface physically contacting the topmost surface of the substrate and the another anode physically contacting the first cathode.

2. The device of claim 1, wherein the first anode, the first electrolyte, and the first cathode are stacked in a direction parallel to the substrate.

3. The device of claim 1, wherein the first anode and the first cathode of the first battery cell are arranged as interleaved fork structures being separated by the first electrolyte.

4. The device of claim 1, wherein a second battery cell is formed in the battery layer, the second battery cell including:
a second anode;
a second cathode; and
a second electrolyte arranged between the second anode and the second cathode such that the first anode, the first cathode, and the first electrolyte have substantially coplanar top surfaces.

5. The device of claim 4 wherein perpendicular projections onto the substrate of each of the first anode, first cathode, the second anode, and the second cathode are non-overlapping.

6. The device of claim 1, further comprising a further battery layer arranged above the battery layer, wherein a further battery cell is formed in the further battery layer, the further battery cell including:
a further anode;
a further cathode; and
a further electrolyte arranged between the further anode and the further cathode such that the first anode, the first cathode, and the first electrolyte have substantially coplanar top surfaces.

7. The device of claim 6 wherein perpendicular projections onto the substrate of each of the further anode and the further cathode are non-overlapping.

8. The device of claim 1 wherein the first anode, the first cathode, and the first electrolyte are arranged in the battery layer such that perpendicular projections onto the substrate of each of the first anode and the first cathode are non-overlapping.

9. The device of claim 1, wherein the first anode does not overlap the first cathode and the first electrolyte,
wherein the first electrolyte does not overlap the first cathode and first anode, and
wherein the first cathode does not overlap the first anode and the first electrolyte.

10. The device of claim 1, wherein the first anode does not overlap the first cathode and the first cathode does not overlap the first anode.

11. The device of claim 1, wherein the another anode having a top surface substantially coplanar with the top surfaces of the first anode, the first cathode, and the first electrolyte.

12. The device of claim 1, wherein the another battery cell includes another electrolyte that physically contacts the another anode.

13. The device of claim 1, wherein the first cathode is formed of a material that includes lithium.

14. A method of manufacturing a device, the method comprising steps of:
providing a substrate; and
forming a battery layer comprising a lateral stack on the substrate, the lateral stack comprising a first layer, a second layer, and a third layer disposed between the first layer and the second layer such that the first layer, the second layer, and the third layer have substantially coplanar top surfaces, wherein the first layer, the second layer, and the third layer form a first battery cell;
wherein the first layer and the second layer are different from each other and are selected from a group consisting of an anode layer and a cathode layer, and wherein the third layer is an electrolyte layer,
wherein the step of forming the battery layer includes:
forming the first layer on the substrate with a sidewall extending to the substrate;
forming the third layer laterally adjacent to the sidewall of the first layer, wherein the third layer has a further sidewall on a side opposite to the side facing the sidewall of the first layer; and
forming the second layer laterally adjacent to the further sidewall of the third layer, and
wherein the second layer is formed in a first trench which is formed in the first layer, and wherein the third layer is formed in a second trench which is formed at an interface between the first layer and the second layer and which is located in at least one of the first layer and the second layer.

15. The method of claim 14, wherein the second layer and the third layer are arranged side-by-side and both formed in the first layer.

16. The method of claim 14, wherein the third layer is formed in the first layer.

17. A system comprising:
a first device; and
a second device including a battery layer on a topmost surface of a substrate, wherein no other portion of the substrate is positioned over the topmost surface of the substrate, wherein a battery cell is formed in the battery layer, the battery cell including:
an anode;
a cathode; and
an electrolyte arranged between the anode and the cathode, wherein each one of the first anode, the first electrolyte, and the first cathode have a bottommost surface physically contacting the topmost surface of the substrate, wherein the anode, the cathode, and the electrolyte have substantially coplanar top surfaces that face away from the topmost surface of the substrate; and
wherein the battery cell is arranged for supplying power to the first device, and
wherein the battery layer further includes another anode associated with another battery cell, the another anode having a bottommost surface physically contacting the topmost surface of the substrate and the another anode physically contacting the cathode.

18. The system of claim 17, wherein the first device is one of a sensor, an actuator, a MEMS device, and an RFID.

19. The system of claim 18, wherein the system is one of a bank-card, a smart-card, and a contact-less card.

20. The system of claim 17 wherein the anode, the cathode, and the electrolyte are arranged in the battery layer such that perpendicular projections onto the substrate of each of the anode and the cathode are non-overlapping.

* * * * *